United States Patent [19]

Colelli et al.

[11] Patent Number: 4,895,665

[45] Date of Patent: Jan. 23, 1990

[54] METHOD FOR TREATING AND RECLAIMING OIL AND GAS WELL WORKING FLUIDS AND DRILLING PITS

[75] Inventors: Cam C. Colelli, 417 Hillcrest Dr., New Philadelphia, Ohio 44663; David I. Mansberry, 10092 Hickory Ridge Dr., Brecksville, Ohio 44141

[73] Assignees: George D. Smith; John J. Smith, both of Canton; Gregory New, Beloit; Cam C. Colelli, New Philadelphia; David I. Mansberry, Brecksville, all of Ohio

[21] Appl. No.: 344,001

[22] Filed: Apr. 26, 1989

[51] Int. Cl.$^4$ .............................................. B01D 21/01
[52] U.S. Cl. ....................... 210/710; 175/66; 210/717; 210/724; 210/747; 210/751; 210/912
[58] Field of Search ................ 175/66; 210/710, 722, 210/724, 751, 770, 747, 715, 768, 800, 804, 170, 702, 726, 717, 912

[56] References Cited

U.S. PATENT DOCUMENTS

| | | | |
|---|---|---|---|
| 2,919,898 | 1/1960 | Marwil et al. | 175/66 |
| 4,079,003 | 3/1978 | Manchak | 210/714 |
| 4,343,706 | 8/1982 | Etzel et al. | 210/912 |
| 4,755,303 | 7/1988 | Sweat | 210/722 |
| 4,781,842 | 11/1988 | Nicholson | 210/751 |

*Primary Examiner*—Peter Hruskoci
*Assistant Examiner*—Krisanne Shideler
*Attorney, Agent, or Firm*—Pearne, Gordon, McCoy & Granger

[57] ABSTRACT

A process for clarifying and reclaiming industrial working fluids and/or outdoor working locations such as oil and gas well working fluids and pits. A treating agent is added to the fluid in an amount exceeding its solubility therein to precipitate soluble contaminants and to form a layer of treating agent over a lower layer of sludge at the pit bottom comprising insoluble contaminants and the precipitates. The layer of treating agent compresses the sludge and serves as a filter/barrier to increase the amount of overlying clarified fluid which can be collected. Following separation of the clarified fluid for disposal or reuse, the sludge is solidified by adding a further treating agent. The process is particularly suited for use in oil and gas well exploration wherein the treating agent is a particulate material including lime.

22 Claims, No Drawings

METHOD FOR TREATING AND RECLAIMING OIL AND GAS WELL WORKING FLUIDS AND DRILLING PITS

BACKGROUND OF THE INVENTION AND PRIOR ART

This invention relates to a process for the ecological reclamation of industrial working fluids and/or outdoor working locations such as those encountered in oil and gas well exploration. The present invention is particularly useful for the clarification of oil and gas well working fluids and drilling pit solidification and reclamation.

Oil or gas well exploration typically includes on site generation of various waste products which are instant to the drilling and exploration process. Drilling pits are usually excavated for use by the operator to assist in the well completion phase of the exploration and are usually found close to the drilling site. There is typically more than one pit used in the drilling operation. The number of pits and the type of discharge into the pit will vary depending upon the nature of the drilling operation. Typically, separate pits are used to contain working fluids including drilling fluid and fracture or return fluid from the formation fracture.

The working fluids have a fresh or saltwater base stock and contain soluble and insoluble contaminants which may be dispersed or colloidally suspended. Insoluble contaminants together with entrapped fluid tend to collect as a layer of sludge several feet deep along the bottom of the pit. In addition to naturally occurring contaminants, artificial contaminants may include chemicals used in the drilling process to aid well stimulation, assist the drilling fluid to carry the drill cuttings out of the hole and protect fresh water zones and the integrity of the hole itself.

Naturally occurring contaminants in the working fluid or pit water comprise silt formed of loose soil, clay, sand, rock and other earthen debris and include indigenous soluble salts such as calcium, sodium and potassium chlorides and iron which is typically present in both ferrous and ferric states. Artificial contaminants are generally chemical additives which include, for example, cationic clay stabilizers, anionic drilling soaps, nonionic surfactants, drilling gels, corrosion inhibitors and bactericides.

The pH of the working fluid or pit water is usually within the range of 4 to 7. On standing, some of the ferrous iron commonly found in the "frac" water returned from the formation and held in the pit is air oxidized to ferric iron in this pH range. The ferric iron precipitates as ferric hydroxide and results in the pit having a rusty red-brown color. The remaining ferrous iron remains in solution. Heavy metals such as barium, lead, cadmium and zinc may also be present in the pit waters.

The drilling permit holder has the responsibility for cleaning up the pit site area in accordance with applicable local and EPA requirements. Pursuant to these requirements, the drilling permit holder must return the site to an ecologically acceptable condition. In the past, the driller tended to separately deal with the clarification of the pit water and the reclamation of the pit area.

In removing the pit water, the driller may dispose of it by either incurring the expense of transporting the water in the pit to a properly licensed disposal site or pumping it into an injection well, e.g. an exhausted oil or gas well. In the latter case, the pit water is first filtered to eliminate solids such as the above-mentioned ferric hydroxide or sand to avoid plugging the well. During this process, it is known that the iron in the ferrous state often interacts with entrained air and becomes oxidized to the ferric state which results in precipitation in the hole and possible plugging and/or the need for expensive clean-up treatment.

In addition to the above reinjection process, the prior art discloses processes for treating particular contaminants present in oil and gas well brines. U.S. Pat. No. 4,465,598 teaches the precipitation of metals including iron, nickel, chromium, cobalt and manganese from oil and gas well heavy brines which have been filtered initially to remove solids. A suitable oxidizing agent is added to the brine to oxidize the metals to an oxidation state of +3 or higher for precipitation as oxides. The pH of the brine may be raised to allow oxide formation by addition of basic substances including alkali metal hydroxides and alkaline earth metal hydroxides including calcium hydroxide. U.S. Pat. No. 4,634,533 teaches an oil and gas well brine treatment including an initial oxidizing treatment to convert iron to the ferric state.

In addition to the treatment and removal of water from the pit, it is necessary to clean and fill the pit in an ecologically suitable manner. The sludge and working fluid remaining in the pit was heretofore distributed within a plurality of subsequently excavated "laterals" comprising narrow channels into which the sludge and remaining fluid was flowed and/or pushed. The laterals have humped bottoms which form separate collection traps for the fluid and sludge. Thereafter, the topsoil excavated in forming the pit and laterals is back-filled. Thus, the prior art pit clean-up processmerely diluted the sludge/working fluid over a larger area provided by the laterals and involved considerable additional excavation costs.

It is also known in the art to use various types of lime for sludge clean-up. U.S. Pat. No. 4,079,003 teaches a process of initially draining the pit water and then applying calcium oxide to solidify the resultant sludge and raise the pH to at least 12.4. The exothermic lime reaction is indicated to convert the sludge into a solid reaction product which is effective to confine the toxic materials. The pH of the sludge is subsequently reduced by addition of acid.

SUMMARY OF INVENTION

In accordance with the present invention, the improvements in fluid clarification and separation are achieved by on-site treatment of contaminated fluids such as oil and gas well working fluids utilizing a solid treating agent to cause precipitation of insoluble contaminants and to more effectively separate such precipitates together with other insoluble contaminants in a layer of sludge disposed below the surface of the fluid. Increased amounts of fluid may be separated as compared with the prior art techniques so as to correspondingly increase the amount of fluid available for recycle or reuse and reduce the further site clean-up process.

The treating agent comprises a particulate solid added to the fluid in an amount exceeding its solubility therein, and the excess solid forms a layer of treating agent over the layer of sludge. The treating agent has a density greater than that of the fluid and compresses the sludge under the force of gravity to cause expulsion of fluid entrapped in the sludge. In addition to immediate expulsion of some additional fluid from the sludge, further fluid will exude through the layer of treating agent for removal in a subsequent fluid separation. In the later case, the layer of treating agent serves as a filter for separating clarified fluid from insoluble contaminants.

Upon removal or separation of the fluid, a further treating agent which is preferably the same as the first treating agent is added to the sludge to treat any remaining fluid entrapped within the sludge and to solidify the sludge to a friable composition which is suitable for dispersement. To that end, the treating agent should preferably provide a hydration reaction with water such as that of the oxides of alkaline earth metals and should solidify the insoluble contaminants. Particularly preferred treating agents comprise particulate lime or lime in its various chemical and physical forms including both dolomitic and high calcium lime.

The application and advantages of the present invention to oil and gas well working fluids and drilling sites is particularly described hereinafter. In such applications, the disclosed process treats both the contaminated fluids and the pit in a combined process to provide clarification of the fluid and reclamation of the pit sludge. Following neutralization of the clarified fluid with an acid, the fluid is suitable for disposal or reuse by the driller. The quality of the clarified fluid is sufficient to justify its use in unrelated applications such as dust control on secondary roads or coal storage.

In the case of oil and gas well working fluids, the preferred treating agent is an alkaline treating agent used in an amount to increase the pH of the fluid to at least about 11 and to cause precipitation of both ferrous and ferric iron hydroxides which will also act as flocculents for suspended or colloidaly dispersed contaminants including drilling gels, clays, drilling muds and the reaction products resulting from combining anionic surfactants and cationic clay stabilizers. As described above, the alkaline agent is used in an amount exceeding that required for precipitation of insoluble components and saturation of the fluid and a layer of the agent is formed over the layer of sludge collected at the bottom of the pit. The layer of agent should be substantially continuous and range in thickness from a fraction of an inch to several inches.

Following settling of the fluid, it is pumped from the pit to substantially expose the entire layer of alkaline treating agent covering the surface of the sludge remaining in the pit. The sludge is then mixed with an alkaline material which is preferably the same agent used to treat the fluid to produce a solidified mixture of sludge and alkaline agent which is friable upon drying. The sludge including the precipitated solids are substantially isolated in the resulting friable composition to thus protect both ground and surface waters.

In accordance with the process of the invention, the clarified fluid may be reused in the oil and gas well exploration process for either air drilling or fracturing so as to reduce the fresh water requirement. This also reduces the total amount of fluid ultimately requiring disposal and the chance of ground water contamination. Further, due to the high costs of transporting water or fluid, the reduction in the amount of fresh water and fluid will also provide significant cost savings.

The increased amount of fluid removed in accordance with the process together with the drying of the sludge by the alkaline treating agent eliminate the need for "laterals" in the final dispersement of the sludge and filling of the pit. More particularly, the dried sludge is merely distributed in the pit area and substantially covered by the return of the topsoil originally removed to form the pit.

DETAILED DESCRIPTION OF THE INVENTION

In accordance with the inventive process, a drilling pit containing working fluid or pit water may be treated at the pit site in a combined process including fluid clarification and pit reclamation. A single particulate treating agent comprising an alkaline treating agent may be used to treat both the fluid and the sludge.

Examples of suitable alkaline agents include lime in any of its various physical and chemical forms such as quicklime, hydrated lime, limestone and hydraulic lime which is a variety of calcined limestone including 10-17% silica, alumina and iron and from 40-45% quicklime. In addition, ammonium hydroxide, sodium hydroxide and other alkali hydroxides and combinations of these materials may be used to enhance the alkalinity of the treating agent. Cementitious materials such as Portland cement and silica containing materials may be used to enhance the solidification characteristics of the treating agent.

Industrial products or byproducts often contain sufficient amounts of alkaline materials to enable their use in the present invention. For example, lime kiln dust is a preferred source of lime. Lime kiln dust is generated during the combustion of limestone to produce lime and, depending upon the particular production facility, contains a high percentage of CaO and/or MgO. A typical dust composition includes about 60% CaO and/or MgO, 9.2% silica, 3.4% alumina, 5.3% carbon, 1.8% sulfur, 1.2% iron, and trace elements; the loss on ignition being 17.2%. Fly ash which also tends to contain significant amounts of CaO, MgO, silica and alumina may be used in combination with an alkalinity enhancing material since the alkaline agent should be sufficiently basic alone or in combination to enable the fluid pH to be increased to at least about 11.

Preferably, the solubility of the alkaline treating agent in the fluid should not be so high as to cause its subsequent neutralization to be burdensome. In the case of lime, the saturation concentration of calcium hydroxide at 0° C. is 1.85 grams/liter. Thus, the salt concentration following neutralization is relatively low.

The particulate size of the alkaline agent should favor formation of a compact dense layer thereof to cover the sludge at the bottom of the pit. The particulate size may range from fine dust to several tenths of an inch. Preferably, the particles may range in size from 80 to −325 Mesh. Excellent results have been obtained with particles in the size range of about 200 Mesh. Also, the density of the alkaline agent particle and its packing capability should result in a layer having a density which exceeds that of the sludge.

It is also desirable that the layer of alkaline agent have a cohesiveness greater than that of the sludge as collected at the pit bottom whereby the layer of agent also serves as a barrier to the insoluble contaminants of the sludge while facilitating the removal of the overlying fluid. This enables the pumping removal of the fluid to a greater degree since the layer of agent is more resistant to dispersement and flow into a pumping intake opening.

In oil and gas well exploration, drilling pits of different sizes and purposes may be excavated as shallow cavities by removal of topsoil and insertion of plastic liners. In the Appalachian basin for example, a smaller pit (10'×50') may be used to retain working fluids including drilling fluid for removal of ground earth and rock, drilling gels and drilling muds utilized during the drilling of the casing. In the drilling in this region, an illustrative drilling gel is a quar gum sold under the name Jaguar by the Alanese Chemical Co. Fresh and salt water drilling muds are supplied commercially by N. L. Baroid under the trade names AQUAGEL and ZEOGEL. It is also common in this drilling region to use a second larger pit (20'×100') for working fluids including primarily frac water and its contaminants. In each case, the pits may be about 6–10' deep.

In the following examples, the alkaline treating agent comprises lime kiln dust having a composition as described above. The dust has a 200 Mesh particle size and an excess of the alkaline agent is used to assure saturation of the working fluid and precipitation of the ferrous and ferric hydroxides.

The amount of lime kiln dust required to achieve the desired pH in the working fluid is based upon the iron contaminant. In the Appalachian basin, the highest concentrations of iron are encountered in frac waters. The iron concentration may be as high as 3,000 mg/l, but typical concentrations range from 500 to 1,500 mg/l. Assuming an iron concentration of 3,000 mg/l, 1,000 barrels of frac water require 2,630 pounds of lime kiln dust containing 60% CaO and/or MgO for neutralization as noted above. Saturation of 1,000 barrels of frac water requires 500 pounds of CaO or 830 pounds of lime kiln dust. Accordingly, the total requirement of lime kiln dust for precipitating the iron content and saturating 1,000 barrels of frac water is 3,460 pounds or about 1.75 tons. In accordance with the process, 5 tons of lime kiln dust are used to treat 1,000 barrels of such frac water in order to provide an excess of 3.25 tons. This is almost 200% more than is required for precipitation of the iron contaminant and saturation of the fluid and this assures achievement of the desired pH and formation of lime kiln dust layer over the sludge.

For clarification of working fluids containing drilling muds, a flocculent may be initially spread over the surface of the pit to assist in precipitation of certain drilling gels if the iron concentration in the fluid is not greater than about 500 ppm. Otherwise, the iron hydroxide precipitates are sufficient to act as the flocculents for such gels.

The lime kiln dust is uniformly distributed over the area of the fluid in the pit by pneumatic spraying onto the upper surface of the fluid or by discharge from a movable nozzle submerged several inches below the surface of the fluid. In the latter technique, it is important that the nozzle does not disturb the formation of the layer of dust formed over the sludge. As indicated above, about 5 tons of lime kiln dust should be used per 1,000 barrels of working fluid or pit water.

In addition to precipitating ferrous and ferric hydroxides, cadmium and zinc hydroxides will also precipitate. Lime kiln dust typically includes sulfate constituents generated upon heating limestone and such provide a sufficient source of ionizable sulfate to precipitate lead and barium sulfate contaminants. If sufficient sulfate is not present in the lime kiln dust, such may be added as $Na_2SO_4$ or as Glauber's salt in its hydrated form $Na_2SO_4.10OH_2O$.

Following the distribution of the lime kiln dust in the working fluid, the pit is allowed to remain undisturbed for several hours. Preferably, the pit is permitted to settle overnight to allow "white fines" of kiln dust to settle and reduce subsequent filtering requirements if the fluid is to be reused.

The settled pit will have a lower layer of sludge which may be about 3' deep comprising insoluble contaminants and precipitates of iron and heavy metals covered by a layer of lime kiln dust. The dust layer may have a wet thickness ranging from about ¼" to about 1½". The lime kiln dust has a sufficient density and packing characteristic to compress the sludge and provide a barrier for filtering fluid expelled upwardly therethrough. The clarified fluid is pumped from the settled pit without disturbing the layer of lime kiln dust. In addition to causing additional fluid in the sludge to be expelled, the dust layer physically confines the sludge which is more easily picked up by the pumping action and allows increased amounts of fluid to be removed by pumping. In a pit initially containing about 1,500–2,000 barrels of fluid before clarification, about 1 barrel of fluid remains in the pit after pumping and the dust layer is substantially exposed. If the empty pit is allowed to stand for several hours, additional fluid exudes through the dust layer in pumpable amounts. For example, in the foregoing pit, an additional 50 barrels of fluid was collected above the dust layer after about 8 hours and then removed by pumping. In the absence of the dust layer, similar pits do not collect additional fluid in amounts removable by pumping.

If the clarified fluid is to be reused as drilling or frac water, it is pumped through 25 micron filters and directly into frac tanks or transfer trucks. Sufficient hydrochloric acid is added to adjust the pH of the fluid on the pump discharge to an acceptable value in the range of 5 to 7. It has been found that 300 gallons of clarified water will require approximately 55 gallons of 20° baume hydrochloric acid. If the treated fluid is to be used as drilling fluid, no further treatment is required.

After the final removal of fluid from the pit, additional lime kiln dust is added to the sludge within the pit for solidification in preparation for closing the pit. In this instance, mixture of the dust and sludge is desired. Accordingly, the dust may be pneumatically injected into the sludge at a lower point adjacent the plastic liner. For example, a pneumatic dust conveying line secured to an arm extending downwardly into the sludge may be traversed throughout the sludge in order to effect addition of the dust and working of the mixture. About 25 tons of dust are added to a pit that initially contained 2,000 barrels of fluid prior to clarification. The resulting mixture of sludge and dust contains about 50% CaO and 50% sludge. The mixture is allowed to set for about 12 hours to form a friable mixture comprising hand size chunks which are readily manually crushed to sand size particles. Below levels of one or two feet, the mixture remains moist and pasty. After about a month, the mixture is comprised of friable chunks throughout its depth. The original topsoil may simply be filled into the pit to cover the friable mixture. In contrast with prior art techniques, there is no need to excavate laterals and further distribute the pit materials.

Examples 1 and 2 in Table I below report compositions before and after clarification in accordance with the invention for fracture fluid and drilling fluid. Also, a leachate analysis is reported for the solidified drilling pit materials.

TABLE I

|  | EXAMPLE 1 Fracture Fluid | | EXAMPLE 2 Drilling Fluid | | |
| --- | --- | --- | --- | --- | --- |
|  | Before | After | Before | After | Leachate |
| Specific Gravity | 1.0190 | 1.0235 | 1.0020 | 1.0110 | 1.0085 |
| pH | 4 | 5 | 5 | 5 | 12 |
| Calcium, as CACO3, mg/l | 5,800 | 9,600 | 1,160 | 6,800 | 5,600 |
| Total Hardness, as CACO3, mg/l | 8,400 | 11,400 | 6,000 | 11,000 | 7,600 |
| Chlorides, Cl—, mg/l | 18,000 | 21,000 | 5,000 | 7,800 | 7,800 |
| Sulfates, SO=, mg/l | 850 | 1,100 | 150 | 1,600 | 1,000 |
| Total Iron, mg/l | 880 | <1 | 20 | <1 | — |
| Ferrous Iron, Fe++, mg/l | 530 | — | — | — | — |

It should be evident that this disclosure is by way of example and that various changes maybe made by adding, modifying or eliminating details without departing from the fair scope of the teaching contained in this disclosure. The invention is therefore not limited to particular details of this disclosure except to the extent that the following claims are necessarily so limited.

We claim:

1. A method of clarifying an industrial working fluid containing soluble and insoluble contaminants retained within a pit means for collecting at the bottom thereof a layer of sludge comprising precipitates of said soluble contaminants and separated insoluble contaminants together with entrapped fluid including the steps of:
    (a) adding a solid particulate treating agent comprising an alkaline earth metal oxide to said fluid in an amount exceeding its solubility therein to cause at least some of the soluble contaminants in the fluid to form a precipitate;
    (b) causing said precipitate and insoluble contaminants to settle and form said layer of sludge and said excess treating agent to form a layer of treating agent substantially covering said layer of sludge at the bottom of said pit means; said treating agent having a density greater than that of said sludge and compressing the layer of sludge under the force of gravity to cause a portion of the entrapped fluid to be expelled therefrom; and
    (c) withdrawing fluid above said layer of treating agent to provide clarified fluid in an amount greater than that possible in the absence of said layer of treating agent.

2. A method according to claim 1, wherein step (c) includes withdrawing sufficient fluid to substantially expose said layer of treating agent, allowing additional fluid to exude through said layer of treating agent and withdrawing said additional fluid.

3. A method according to claim 1, wherein said layer of treating agent has a cohesive strength greater than that of the layer of sludge.

4. A method according to claim 3, wherein said treating agent particles range in size from 80 to —325 Mesh, and said layer of treating agent has a thickness in the range of rom about ¼" to about 1½".

5. A method according to claim 4, wherein said treating agent is added in an amount sufficient to increase the pH of said fluid to at least 11.0.

6. A method according to claim 5, wherein said treating agent includes lime.

7. A method according to claim 5, wherein said fluid contaminants include soluble iron chloride which react with said treating agent to form ferric and ferrous hydroxide precipitates.

8. A method according to claim 5, wherein said fluid is oil and gas well drilling working fluid and said contaminants include iron chlorides which react with said treating agent to form ferric and ferrous hydroxide precipitates.

9. A method according to claim 8, wherein said working fluid contaminants also include dispersed and colloidally suspended contaminants of chemical additives used in oil and gas drilling and recovery, and said ferric and ferric hydroxide precipitates cause flocculation of said dispersed and colloidally suspended contaminants in said fluid.

10. A method according to claim 8, including the further steps of filtering and neutralizing the clarified fluid withdrawn in step (c) for reuse as drilling fluid or frac water.

11. A method according to claim 8, wherein said working fluid contaminants include barium and lead, and said treating agent also includes ionizable sulfates for reaction with the barium and lead to form barium and lead sulfates.

12. A method according to claim 10, including the further step of:
    (d) adding a second treating agent to said layer of first mentioned treating agent and layer of sludge solidified to form a mixture of treating agents and sludge.

13. A method according to claim 12, wherein step (d) includes pneumatically injecting said second treating agent into said layer of sludge as the treating agents are blended with the sludge.

14. A method according to claim 13, wherein said second treating agent includes lime.

15. A method according to claim 14, wherein said solidified mixture is 50% lime by weight.

16. A method according to claim 13, wherein each of said treating agents is lime kiln dust.

17. A method according to claim 16, wherein step (a) includes adding an excess of about 200% by weight of lime kiln dust based on the amount of lime kiln dust required for precipitation and saturation.

18. A method according to claim 1, wherein said fluid has a surface area substantially corresponding with that of said pit bottom, and step (a) includes distributing said treating agent over substantially the entire area of said fluid retained within said pit means.

19. A method of clarifying and reclaiming an oil and gas well working fluid and pit, said working fluid containing soluble and insoluble contaminants, said working fluid being retaind within said pit during well exploration with collection at the pit bottom of a layer of sludge comprising precipitates of said soluble contaminants and separated insoluble contaminants together with entrapped fluid including the steps of:
    (a) adding a solid particulate treating agent comprising an alkaline earth metal oxide to said fluid in an amount exceeding its solubility therein to cause at least some of the soluble contaminants in the fluid to form a precipitate;
    (b) causing said precipitate and insoluble contaminants to settle and form said layer of sludge and said excess treating agent to form a layer of treating agent substantially covering said layer of sludge at the bottom of said pit means; said treating agent having a density greater than that of said sludge and compressing the layer of sludge under the force of gravity to cause a portion of the entrapped fluid to be expelled therefrom; and (c) withdrawing fluid above said layer of treating agent to provide clarified fluid in an amount greater than that possible in the absence of said layer of treating agent; and (d) adding a second treating agent to comprising an alkaline earth metal oxide to said layer of first mentioned treating agent and layer of sludge solidified to form a mixture of treating agents and sludge.

20. A method according to claim 19, wherein each of said treating agents is lime kiln dust.

21. A method according to claim 20, wherein step (a) includes adding an excess of about 200% by weight of lime kiln dust based on the amount of lime kiln dust required for precipitation and saturation.

22. A method according to claim 21, wherein said solidified mixture is 50% lime by weight.

* * * * *

UNITED STATES PATENT AND TRADEMARK OFFICE
CERTIFICATE OF CORRECTION

PATENT NO. : 4,895,665

DATED : January 23, 1990

INVENTOR(S) : Colelli et al

It is certified that error appears in the above-identified patent and that said Letters Patent is hereby corrected as shown below:

Title page, Item [75]:   "David I. Mansberry" should read
                         --David I. Mansbery--

Title page, Item [73]:   "David I. Mansberry" should read
                         --David I. Mansbery--.

Signed and Sealed this

Ninth Day of July, 1991

Attest:

HARRY F. MANBECK, JR.

*Attesting Officer*            *Commissioner of Patents and Trademarks*